March 21, 1939.    F. A. WARD    2,150,952

UNIVERSAL JOINT

Filed Aug. 18, 1938

INVENTOR
FREDERICK A. WARD
BY
ATTORNEYS

Patented Mar. 21, 1939

2,150,952

UNITED STATES PATENT OFFICE 2,150,952

UNIVERSAL JOINT

Frederick A. Ward, Highland Park, Mich., assignor to Gear Grinding Machine Company, Detroit, Mich., a corporation of Michigan Application August 18, 1938, Serial No. 225,642

2 Claims. (Cl. 64—21)

The invention relates to torque transmitting constant velocity universal joints of that type comprising outer and inner members and intermediate balls engaging registering axially extending grooves therein. Various constructions of this type have heretofore been devised in all of which the attempt is made to maintain the plane of rotation of the balls so as to substantially bisect the angle between the axes of the outer and inner members in all positions of relative adjustment thereof. In certain of these constructions ball retaining cages have been placed intermediate the outer and inner members being provided with spherical surfaces which are concentric with the point around which the joint is angularly adjusted. With other constructions the pilot is provided with eccentric spherical surfaces imparting thereto a wedge-shaped cross section which compels a movement of the balls substantially one-half the relative angular movement of the outer and inner members. The present invention is of the latter type and has as its object a simplified construction which facilitates manufacture and reduces the cost thereof. To this end the invention consists in the construction as hereinafter set forth.

Figure 1:
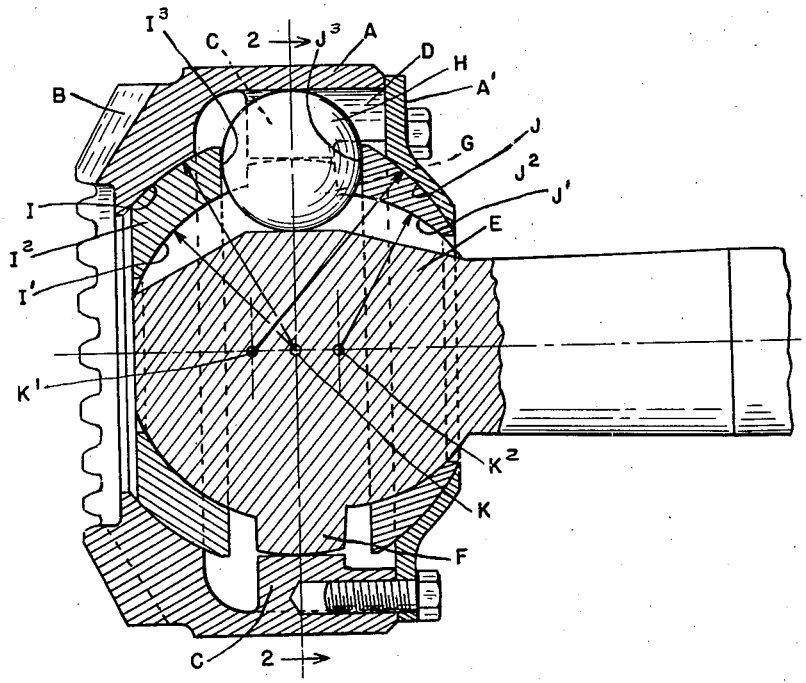
Figure 1 is an axial section through my improved universal joint.
Figure 2:
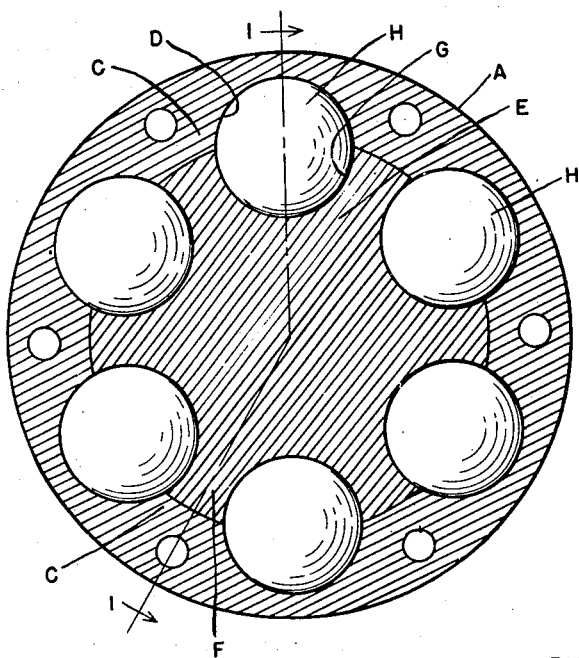
Figure 2 is a cross section on line 2—2 of Figure 1.

While my improved joint may be used for various purposes I have specifically illustrated a construction designed for use in a differential gearing for driving axles. This comprises an outer member A having a beveled gear wheel B integral therewith and with a central inwardly extending annular portion C provided with axially extending ball race grooves D therein. The inner member E has an outwardly extending annular portion F with axial ball race grooves G therein registering with the grooves D. Balls H engage the registering grooves and the diameter of these balls is greater than the axial length of the annular portions in which the grooves are formed. At opposite ends of the central annular portions said outer and inner members are provided with spaced spherical zones I, I', J, J'. Annular pilot members $I^2$ and $J^2$ having corresponding spherical surfaces are placed intermediate the spaced zones and are also provided with radial surfaces $I^3$, $J^3$ which bear against the balls. The spherical zones I, I' have coincident centers which also form the center K of relative angular movement of the outer and inner members. The spherical zones J, J' have centers K', $K^2$ which are non-coincident and arranged respectively on opposite sides of and equally spaced from the center K. This imparts to the pilot member $J^2$ a wedge-shaped cross section which in cooperation with the zones J, J' forms a cam. Also, by reason of the fact that the centers K', $K^2$ are equally spaced on opposite sides of the center K the amount of angular movement imparted to the pilot $J^2$ is approximately one-half the relative angular movement of the axes of the outer and inner members A and E. The pilot $J^2$ communicates its movement to the balls, which in turn actuate the pilot member $I^2$, so that in all positions of angular adjustment the plane of rotation in the balls substantially bisects the angle between the axes of the outer and inner members. A further function performed by the pilot members $J^2$, $I^2$ is to hold the outer and inner members always concentric with the point K.

To facilitate assembly of the joint the outer member A is provided with a detachable cap member A' on which the zone J is formed. The zone I is, however, formed on an integral portion of the member A and the inwardly extending annular portion C is also preferably integral therewith. The central annular portions C and G as shown, are in contact with each other, the portion C having a cylindrical surface, and the portion G a spherical surface. This, however, is not necessary as the joint will be centered by the pilots $I^2$ and $J^2$, and requires no contact between the members C and G.

One advantage of the construction is that the outer and inner surfaces of the pilot $I^2$ are parallel, and together with the zones I, I' are concentric with the point K. Such a structure is more easily manufactured than one in which the spherical surfaces are eccentric to each other. There is not, however, any loss of function for the single wedge-shaped pilot $J^2$ serves to actuate the balls, and the pilot $I^2$ holds the balls in contact therewith.

What I claim as my invention is:

1. In a universal joint, outer and inner rotary members having registering axially extending ball race grooves therein, and pairs of opposed spherical zones at opposite ends of said grooves, balls in said grooves for transmitting torque from one of said members to the other, and floating pilot members arranged intermediate the opposed zones of said pairs, the centers of the outer and inner zones of one pair being coincident and the centers of the outer and inner zones of the other pair being non-coincident and respectively arranged on opposite sides of the center for the first pair, said pilots contacting with said balls and cooperating to center the joint and to maintain the plane of rotation of the balls substantially bisecting the angle between the axes of said outer and inner members in each position of adjustment thereof.

2. In a universal joint, outer and inner rotary members having registering axially extending ball race grooves therein and pairs of opposed spherical zones at opposite ends of said grooves, balls in said grooves for transmitting torque from one of said members to the other, and floating pilot members arranged intermediate the opposed zones of said pairs, the centers of the outer and inner zones of one pair being coincident and the centers of the outer and inner zones of the other pair being non-coincident and respectively arranged on opposite sides of the center for the first pair, said pilots being provided with radial surfaces which are tangent to the balls and in contact therewith, whereby any relative angular movement between the axes of the outer and inner members will impart substantially one-half said angular movement to said pilots and balls.

FREDERICK A. WARD.